Figure 1:
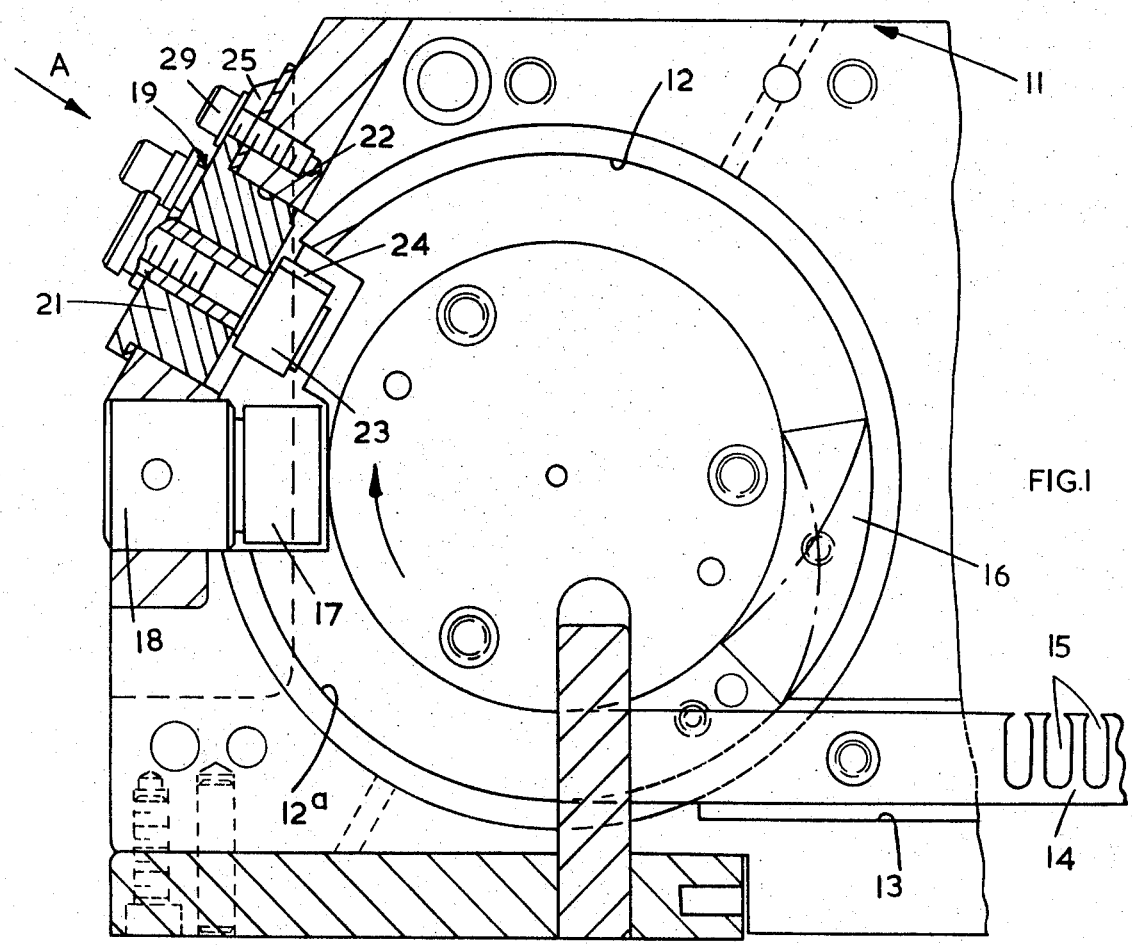

United States Patent [19]

Cockin

[11] 3,845,647

[45] Nov. 5, 1974

[54] STATOR ASSEMBLIES FOR DYNAMO ELECTRIC MACHINES

[75] Inventor: Robert Cockin, Quarry Bank, near Brierley Hill, England

[73] Assignee: Joseph Lucas (Electrical) Limited, Birmingham, England

[22] Filed: Oct. 10, 1972

[21] Appl. No.: 296,158

[30] Foreign Application Priority Data
Oct. 8, 1971   Great Britain................... 46851/71

[52] U.S. Cl......................... 72/137, 29/605, 72/371
[51] Int. Cl............................................ B21f 35/02
[58] Field of Search............ 72/135, 136, 371, 137; 29/596, 605

[56] References Cited
UNITED STATES PATENTS

| | | | |
|---|---|---|---|
| 1,850,885 | 3/1932 | Lane..................................... | 72/136 |
| 2,537,435 | 1/1951 | Warmey............................ | 72/135 X |
| 3,243,623 | 3/1966 | Hart.................................... | 29/605 X |
| 3,577,851 | 5/1971 | Detheridge.......................... | 29/596 |

Primary Examiner—Charles W. Lanham
Assistant Examiner—Robert M. Rogers
Attorney, Agent, or Firm—Holman & Stern

[57] ABSTRACT

A method of forming a stator assembly for a dynamo electric machine. The stator assembly is of the kind including a laminated member in the form of a helically coiled metal strip, and the method includes driving the metal strip into a former which coils the strip helically. As the strip is coiled helically a set is imparted to the strip so that the convolutions of the coiled strip produced are biased towards one another in an axial direction by their own inherent resilience. Apparatus for performing the method includes a former having a cylindrical concave surface. A driving arrangement drives the metal strip against the cylindrical concave surface of the former so that the strip is deformed into a helical coil. The apparatus includes means for example including a pair of rolls between which the strip passes, and which deflect the strip, so as to impart to the strip a set such that the convolutions of the helically coiled strip produced are biased in an axial direction towards one another.

7 Claims, 4 Drawing Figures

STATOR ASSEMBLIES FOR DYNAMO ELECTRIC MACHINES

This invention relates to a method of, and apparatus for, forming stator assemblies for dynamo electric machines, the stator assemblies being of the kind including a laminated member in the form of a helically coiled metal strip.

A method according to the invention includes driving a metal strip into a former which coils the strip helically and imparting to the strip as it is coiled a set such that the convolutions of the coiled strip produced are biased towards one another in an axial direction by their own inherent resilience.

Apparatus according to the invention comprises, a former having a cylindrical concave surface, a driving arrangement for driving metal strip against said surface so that said strip is deformed into a helical coil, and means for imparting to the strip a set such that the convolutions of the helically coiled strip produced are biased in an axial direction towards one another.

Preferably said means includes a pair of rolls within the former between which the strip passes the positions of the rolls in relation to each other and to the remainder of the former being such that the strip is deflected relative to its initial plane during passage through the former.

Figure 2:
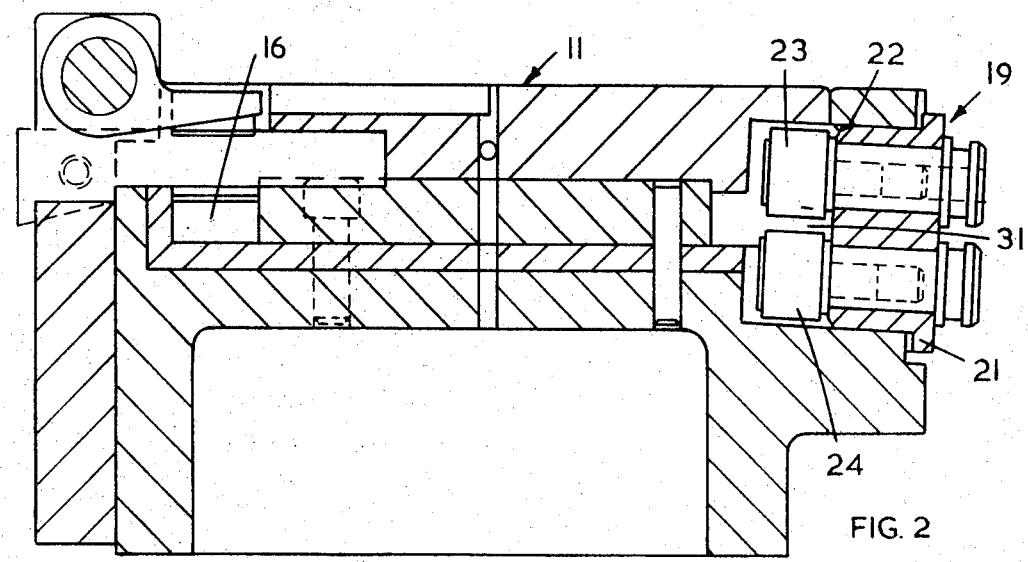
Figure 3:
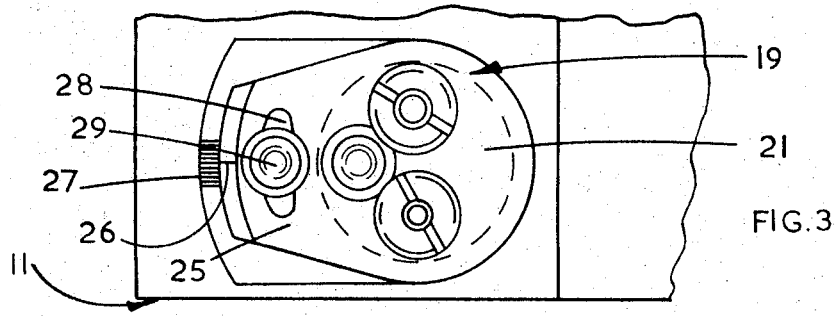
Figure 4:
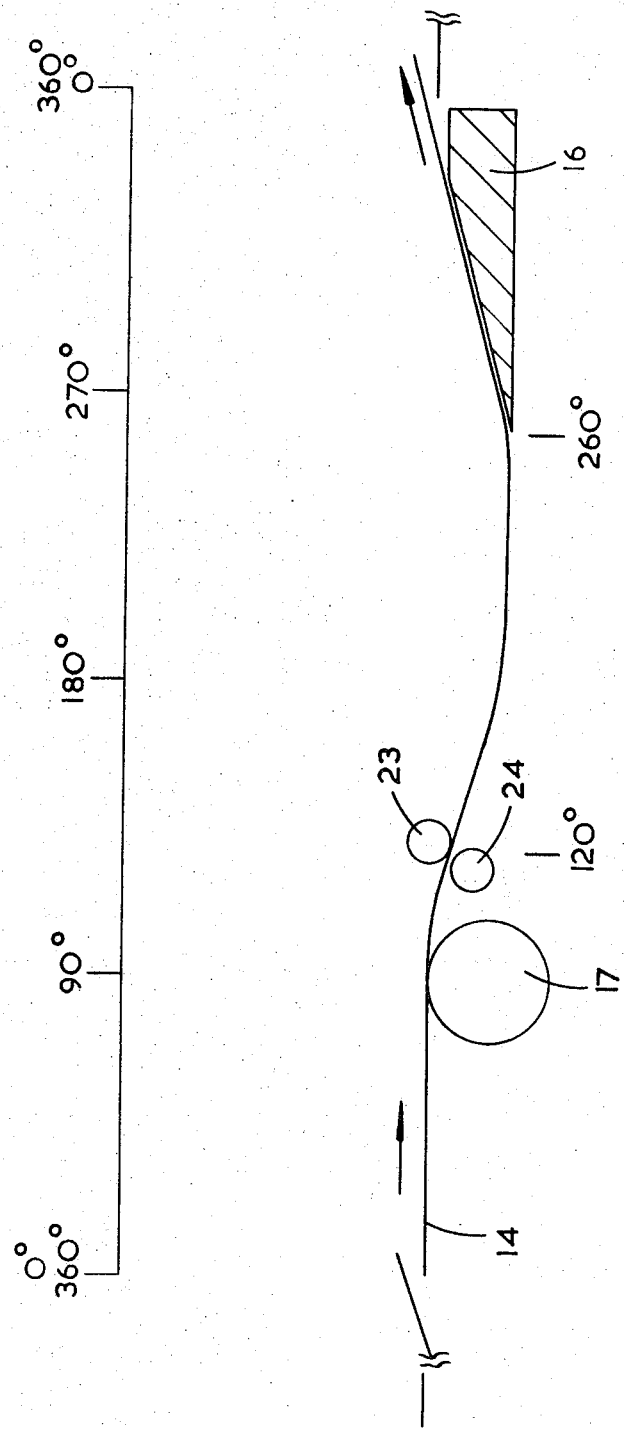

One example of the invention is illustrated in the accompanying drawings wherein:

FIG. 1 is a plan view partly in section of part of a machine for use in the manufacture of a stator assembly, FIG. 2 is a sectional view of the arrangement shown in FIG. 1, but taken in a plane at right angles to the plane of FIG. 1, FIG. 3 is a fragmentary side elevational view in the direction of arrow A in FIG. 1, and FIG. 4 is a developed representation of the passage of the strip through the former.

Referring to the drawings, the machine includes a body 11 having therein an annular chamber 12. The chamber 12 has a tangential inlet 13 through which mild steel strip 14 formed with a series of stator slots 15, is driven into the chamber 12. A gear wheel (not shown) the teeth of which engage in the slots 15, is used to drive the strip 14 into the chamber 12, the gear wheel being driven by an electric motor, and rotating in a plane at right angles to the plane of the strip 14. The radial width of the chamber 12 is substantially equal to the width of the strip 14, and the height of the chamber 12 is slightly greater than the thickness of the strip 14. As the strip enters the chamber 12 by way of the inlet 13 the strip abuts against the cylindrical convex surface 12a of the chamber 12 adjacent the inlet 13, and since the strip is being driven into the chamber the strip is deformed and follows the confines of the chamber 12. After performing almost a complete revolution within the chamber 12 the strip encounters an arcuate ramp surface 16 which guides the strip 14 upwardly out of the plane of the inlet 13, and into an outlet (not shown) from which the strip issues in the form of a helical coil.

Within the chamber 12, and between the inlet and outlet thereof is a first cylindrical roll 17 over which the strip must pass. The roll 17 is mounted for rotational movement about an axis which extends radially of the chamber 12 and is carried by a block 18 fixedly secured to the body 11. Between the roll 17 and the strip outlet is an adjustable roll assembly 19. The roll assembly 19 includes a cylindrical carrier 21 mounted for angular movement in a bore 22 in the wall of the body 11. The bore 22 communicates with the chamber 12, and projecting into an enlarged region of the chamber 12 from the bore 22 are second and third rolls 23, 24 respectively. The axis of the bore 21 is disposed generally radially with respect to the chamber 12, but is inclined upwardly at a small angle out of the plane of the chamber 12. The axes of the rolls 23, 24 are parallel to the axis of the bore 21, and so are similarly inclined with respect to the plane of the chamber 12. The carrier 21 includes an integral extension 25 which has marked thereon a datum line 26 associated with a scale 27 provided on the exterior surface of the wall of the body 11. Extending through an arcuate slot 28 in the extension 25 and engaged with the body 11 is a clamping screw 29 whereby the angular position of the carrier 21 and therefore the rolls 23, 24 with respect to the body can be fixed. The axes of the rolls 23, 24 are spaced apart in a direction generally at right angles to the plane of the chamber 12, and the diameters of the rolls 23, 24 are such that a gap 31 occurs between the rolls. It will be appreciated that the positioning of the gap 31 in relation to the plane in which the strip 14 is moving, and the angular position of the carrier 21 within the bore 22, will determine the degree of deflection of the strip 14 which passes over the roll 17, and through the gap 31 between the rolls 23, 24. Thus, for example had the gap 31 been in the plane of the incoming strip, with the plane containing the axes of the rolls 23, 24 at right angles to the strip, then there would be no deflection of the strip, other than that owing to the inclination of the gap 31 by virtue of the inclination of the axes of the rolls 23, 24 to the plane of the chamber 12. However, in practice the gap 31 is set below the level of the incoming strip, and so the strip must pass over the roll 17 and then downwardly to pass between the rolls 23, 24. Furthermore, the block 21 is so positioned in the bore 22 that a plane containing the axes of the rolls 23, 24 is inclined to the plane of the strip rather than being at 90° to the plane of the strip. The actual inclination will depend upon the physical nature of the strip 14, but in one example the plane containing the axes of the rolls 23, 24 is disposed at 86½° to the plane of the strip. The rolls 23, 24 do not engage the whole width of the strip, but work only on the continuous part of the strip from which the fingers defining the slots 15 extend laterally.

As the strip is driven around the chamber 12 the strip is deflected first by the rolls 23, 24, then by the base of the chamber 12, and finally by the ramp 16. The working of the strip which occurs in its passage through the former imparts to the helically coiled strip issuing from the outlet of the chamber 12 a set such that the coiled strip has a natural bias, by virtue of its inherent resilience, in a direction to move the convolutions of the coiled strip towards one another. Thus the strip issuing from the outlet of the chamber 12 builds up in an easily controllable coil the convolutions of which are urged into contact with one another by their own inherent resilience.

The exact mechanism of imparting to the strip a set as the strip is coiled is not fully understood and so it is not possible to predict exactly the setting of the rolls 23, 24 and the positioning of the rolls 23, 24 relative to the remainder of the former which is required to coil a given type of strip. The settings for different types of strip are readily achieved on an experimental basis, and can then of course be noted. It is believed that although the rolls 23, 24 play major parts in the working of the strip to produce the necessary set, the deflection of the strip by the base of the chamber 12 after the strip has been deflected by the rolls 23, 24 and also the further deflection of the strip by the ramp 16, are believed to play a part the production of the necessary set in the coiled strip.

In order to facilitate adjustment of the gap between the rolls 23, 24 the roll 23 is mounted eccentrically on a member rotation of which moves the roll 23 relative to the roll 24. The member which carries the roll 24 is rotatably supported in the carrier 21.

In a modification the carrier 21 is dispensed with and the roll 23 is carried by a movable arm adjustably coupled to the body of the former. The roll 24 is fixed and movement of the arm adjusts both the gap between the rolls and the degree of deflection of the strip caused by the rolls 23, 24.

Associated with the feed mechanism for supplying strip to the chamber 12 is a measuring arrangement which measures the length of strip being fed. When a predetermined length of strip has passed through the apparatus the feeding of strip is momentarily ceased, and a guillotine adjacent the outlet of the chamber 12 is operated to sever a helically wound coil of strip which is then moved either to a store or to further apparatus for forming the helically wound strip into a laminated stator.

I claim:

1. A method of forming a stator assembly for a dynamo electric machine, of the kind including a laminated member in the form of a helically coiled metal strip, comprising, driving a metal strip into a former which coils the strip helically, and, imparting to the strip as it is coiled a set such that the convolutions of the coiled strip produced are biassed towards one another in an axial direction into facial contact with one another by their own inherent resilience, so that the helical coil of metal strip is produced in a collapsed condition, the set being imparted to the strip by deflecting the strip relative to its initial plane during passage through the former.

2. Apparatus for use in forming a stator assembly, for a dynamo electric machine, of the kind including a laminated member in the form of a helically coiled metal strip, the apparatus including a former having a cylindrical concave surface, a driving arrangement for driving metal strip against said surface so that said strip is deformed into a helical coil, and, means for imparting to the strip a set such that the convolutions of the helically coiled strip are biassed in an axial direction whereby the apparatus produces a collapsed helical coil of metal strip, said means imparting said set to said strip by deflecting said strip relative to its initial plane, and said means being so positioned in the path of movement of the strip through the apparatus that the set is imparted to the strip during its passage through the former.

3. Apparatus as claimed in claim 2 wherein said means includes a pair of rolls within the former between which the strip passes, the positions of the rolls in relation to each other and to the remainder of the former being such that the strip is deflected relative to its initial plane during passage through the former.

4. Apparatus as claimed in claim 3 wherein said means further includes an arcuate ramp which deflects the strip during its exit from the former.

5. Apparatus as claimed in claim 3 wherein the position of said rolls relative to one another is adjustable.

6. Apparatus as claimed in claim 3 wherein the orientation of said rolls relative to the remainder of the former is adjustable.

7. Apparatus as claimed in claim 3 wherein the axes of said rolls are parallel, radial with respect to the former, and inclined at a small angle to the plane of the strip.

* * * * *